Oct. 22, 1929.  H. A. DENMIRE  1,732,931
TIRE BUILDING CORE
Filed July 12, 1928

INVENTOR
Harold A. Denmire
BY Evans & McCoy
ATTORNEYS

Patented Oct. 22, 1929

1,732,931

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

TIRE-BUILDING CORE

Application filed July 12, 1928. Serial No. 292,098.

This invention relates to tire building cores of the type upon which pneumatic tire casings are built.

In the manufacture of pneumatic tire casings, layers of fabric and rubber are built up upon an annular core which is shaped to conform to the interior of the finished tire casing. The inner layer of fabric is applied in strip form directly to the core and, in order to hold the edges of the fabric strip against the sides of the core, it has been the practice to apply to the sides of the core before each tire building operation, a coating of rubber cement to which the edge portions of the fabric strip adhere. After each tire building operation, it is necessary to clean off the old cement coating and to apply a fresh coating of cement.

The present invention has for its object to lessen the labor incident to the building of tires on a core and to speed up the tire building operation by providing a core to which the fabric will adhere, but which does not require cleaning and coating with cement between the tire building operations.

More specifically, it is the object of the invention to provide a tire building core with inserts or plugs of a tacky material such as partially vulcanized rubber which projects slightly from the surface of the core and provides closely spaced adhesive surfaces to which the fabric will adhere, the finished tire casings being removable from the core without destroying the plugs or inserts.

With the above and other objects in view, the invention may be said to comprise a tire building core as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Figure 1:
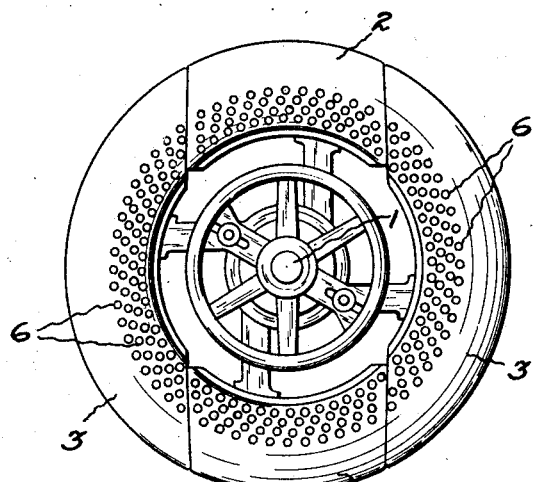
Figure 1 is a side elevation of a tire building core embodying the invention.
Figure 2:
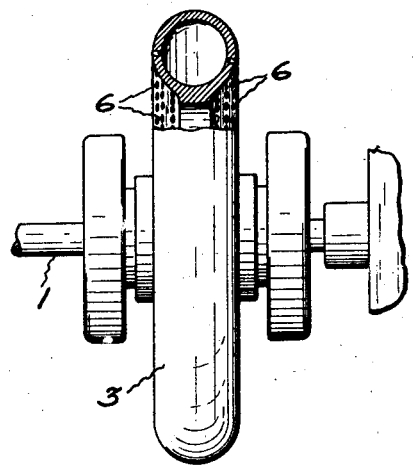
Fig. 2 is a front elevation of the core, a portion of the core being broken away and shown in section.
Figure 3:
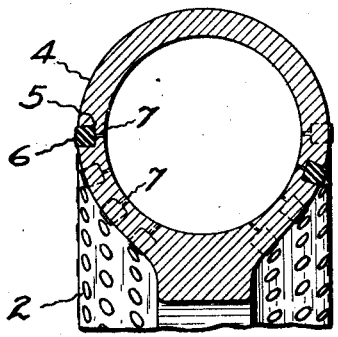
Fig. 3 is a radial section through the core shown on an enlarged scale.

Referring to the accompanying drawings, the tire building core of the present invention is a sectional core mounted upon a shaft 1 and adapted to be collapsed so that a finished tire casing can be readily removed therefrom, the annular core consisting of two short segments 2 and two longer segments 3, the segments 2 being collapsible between the segments 3 to the interior of the annulus and being movable on the shaft 1 laterally with respect to the segments 3 so that the segments 3 can be collapsed to free the tire casing.

The core segments are formed of metal, are hollow and of a shape to conform to the interior of a tire casing. The outer surface 4 of the core is provided throughout the circumference of the core on opposite sides thereof with closely spaced recesses 5, which contain plugs or inserts 6 of a tacky material such as partially vulcanized rubber to which the tire fabric will adhere. These plugs or inserts have a tight fit in the recesses 5 and project slightly from the surface of the core so that as the edge portions of the fabric strip are pressed against the sides of the core, the fabric will tightly adhere to the plugs or inserts 6 so that the fabric is held tightly against the core. After the tire building operation is completed, the tire casing can be readily peeled off from the core without damage to the inserts so that the core can be again immediately used for building another tire casing.

The plug 6 may be directly pressed into the recess 5 in which case small openings 7 are provided from the bottom of each recess to the interior of the core to permit the air to escape from the recess when the plugs are inserted.

Figure 4:
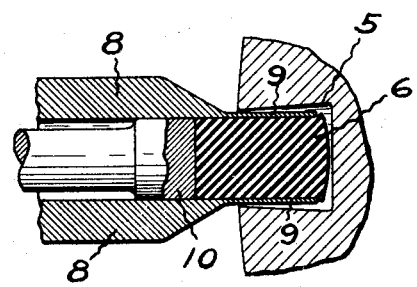
Fig. 4 is a fragmentary detailed view showing a method of inserting the plugs in the recesses of the core.

Another method of inserting the plugs is illustrated in Fig. 4 in which the plug is gripped by clamping jaws 8 which have thin end portions 9 adapted to be inserted into the recess 5. Clamping jaws 8 are grouped about a central plunger 10 of less diameter than the recess so that when the plug is gripped between the jaws, it is compressed to a diameter less than that of the recess permitting the end portions 9 of the jaws to be inserted with the plug into the recess. The jaws 8 may then be withdrawn while the plunger 10 is held stationary to hold the plug in the recess, the plug expanding by reason of its elasticity when released to fill the recess. The plugs are preferably composed of partially vulcanized rubber which is sufficiently tacky to firmly adhere to the strip of fabric as it is applied to the core.

Figure 5:
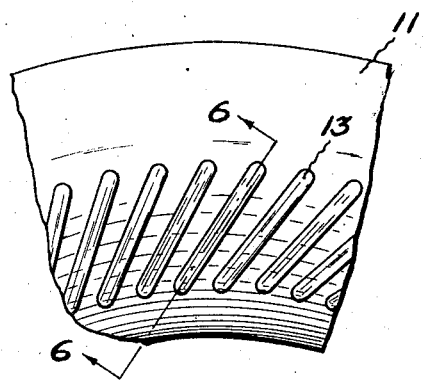
Fig. 5 is a fragmentary side elevation showing a modified form of insert.
Figure 6:
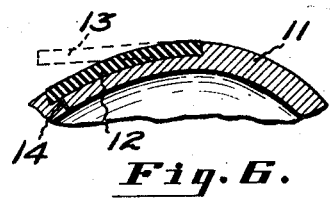
Fig. 6 is a section taken on the line 6—6 of Fig. 5.

In Figs. 5 and 6 of the drawing, there is shown a tire core having plugs or inserts of a form somewhat different from that shown in Figs. 1 to 4. In this modification, the core member 11 is provided with elongated diagonally disposed grooves 12 which receive rubber strips 13 which have a tight fit in the grooves. The strips 13 may be inserted in the grooves in any suitable manner, for instance, one end of the strip may be inserted in one end of the groove as shown in Fig. 6 and the strip gradually pressed into the groove.

In order to prevent air being trapped between the insert and the bottom of the groove, small air holes 14 may be provided from the bottom of the groove to the interior of the core to permit air to escape from the bottom of the groove, while the strip is being forced into the groove.

Provision of adhesive inserts in the sides of the core save considerable labor, since no cleaning or coating operations are necessary between successive tire building operations, the partially vulcanized rubber inserts providing adhesive surfaces upon which a large number of tire casings may be built before it is necessary to renew the inserts.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A tire building core having, upon its outer surface, inserts of a tacky material to which the tire fabric will adhere.

2. A tire building core having, upon its outer surface throughout the opposite sides thereof inwardly of the tread portion, inserts of a tacky material to which the tire fabric will adhere.

3. A tire building core having upon its outer surface inserts of partially vulcanized rubber.

4. A tire building core having closely spaced plugs of partially vulcanized rubber secured thereto along opposite sides thereof.

5. A tire building core shaped to conform to the interior of a tire casing and having closely spaced recesses on the opposite sides thereof, plugs of partially vulcanized rubber fitting in said recesses and projecting slightly from the surface of the core.

In testimony whereof I affix my signature.

HAROLD A. DENMIRE.